Oct. 20, 1970  F. D'ASCENZO, JR  3,534,621
LINEAR ACTUATOR WITH LOCKING MEANS
Filed March 12, 1968
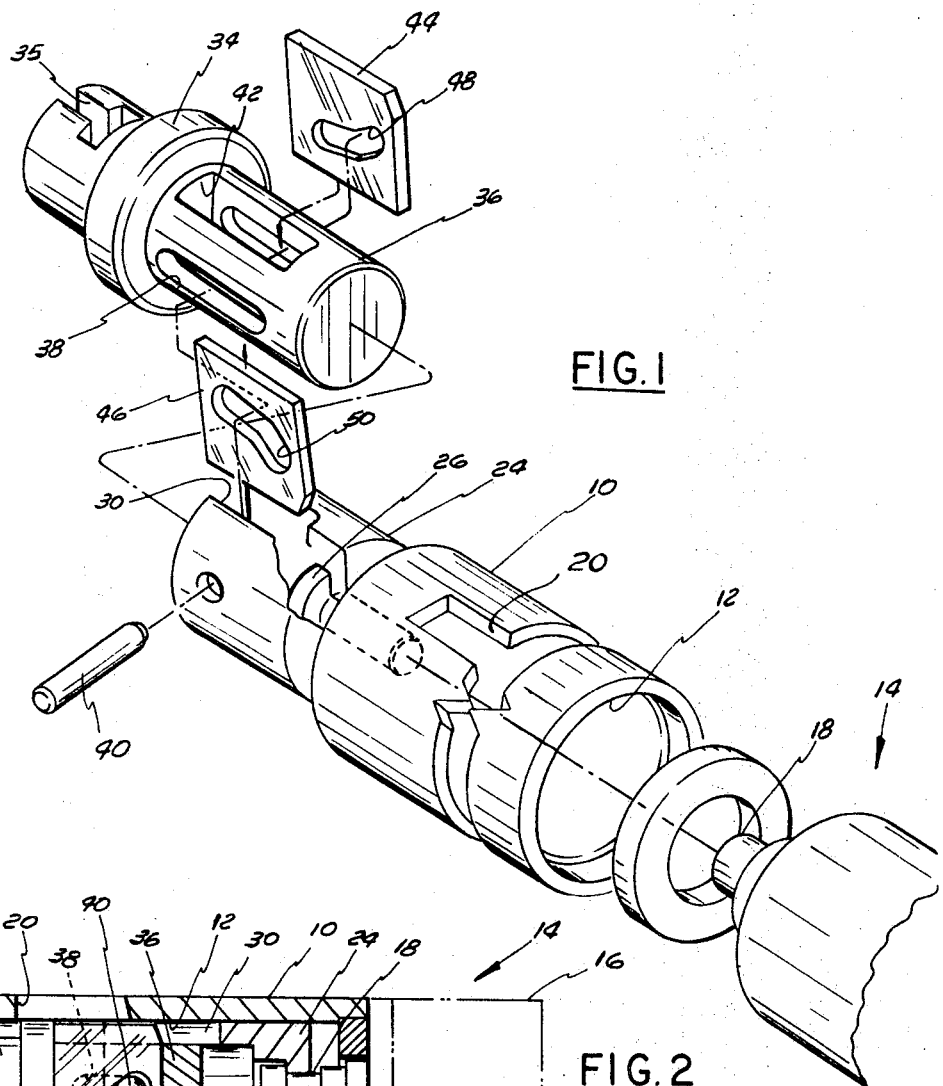
INVENTOR.
FRANK D'ASCENZO JR.
BY
Hauke, Knaus, Gifford & Patalidis
ATTORNEYS 3,534,621
LINEAR ACTUATOR WITH LOCKING MEANS
Frank D'Ascenzo, Jr., 23280 S. Nunnelly Road,
Mount Clemens, Mich. 48043
Filed Mar. 12, 1968, Ser. No. 712,449
Int. Cl. F16h 21/44, 21/54, 25/18
U.S. Cl. 74—110                                              14 Claims

ABSTRACT OF THE DISCLOSURE

A linear actuating arrangement for coupling the rod of a power cylinder to an actuatable member which is subjected to secondary forces such as the die of an injection molding machine. The arrangement includes driven and driving coupling members disposed in a housing attached to the end of the cylinder and movable relative to one another as the rod moves the two couplings in forward and reverse directions. A pair of locking plates carried by the driven coupling member respond to the relative movement of the two coupling members as the rod is extended from the cylinder by moving into a pair of openings in the housing so as to lock the actuatable member against movement when the rod is fully extended from the cylinder. Thus the secondary forces acting on the actuatable member are transmitted to the housing instead of to the rod.

BACKGROUND OF THE INVENTION

This invention relates to self-locking actuating arrangements and more specifically to an arrangement for coupling a driven member to a driving member which moves linearly between a pair of spaced positions with locking means on the driven member activated by relative motion between the two members to automatically lock the driven member in one of the positions.

Fluid power cylinders are widely employed for transforming hydraulic or pneumatic energy into linear, mechanical motion. The piston rod of the cylinder is coupled to an operating member of a machine and alternately extended and retracted to impart reciprocatory motion to the operating member. For example, the operating member may be the die of the injection molding apparatus which is alternately opened and closed during its operating cycle.

One problem with an actuating arrangement employing a simple coupling between the power cylinder and the actuated member is that secondary forces acting on the actuated member are transmitted back through the coupling to the piston rod. When the piston rod is fully extended, the internal components of the cylinder are exposed to damage.

SUMMARY

The preferred embodiment of the present invention, which will be subsequently described in greater detail, comprises a sleeve-like housing fixedly mounted on the end of a fluid cylinder. Driving and driven coupling members are slidably disposed in the housing for linear motion. The driving coupling member is connected to the cylinder's piston rod for motion in forward and reverse direction as the rod is extended and retracted by the cylinder. The driven coupling member is adapted for connection to an actuable member such as the die of an injection molding apparatus. The driving coupling member has a collar portion mated with a nose portion of the driven coupling. A pin fixedly mounted to the collar extends through a slot in the nose so that the two coupling members are joined but axially movable relative to one another.

A pair of locking plates are mounted in a second slot in the nose for movement between extended and retracted positions in lateral directions relative to the motion of the driven coupling member. Each of the locking plates is coupled with the locking pin so that relative movement between the two coupling members toward one another causes the locking plates to extend, and away from one another causes the locking plates to retract.

As the piston rod is extended from its fully retracted position, it moves the driving coupling in the forward direction so that the pin causes the driven coupling to move in the forward direction and the locking plates to extend from their fully retracted position. As the piston rod approaches its fully extended position, the locking plates are received in a pair of lateral openings in the housing so that the driven coupling is locked to the housing. Thus, forces acting on the driven coupling when the rod is fully extended are transmitted through the locking plates to the housing and not to the driving coupling. Retraction of the piston rod causes the driving coupling to move away from the driven coupling so that the pin pulls the driven coupling in the reverse direction. The relative motion between the two coupling members causes the locking plates to retract from their extended positions thereby permitting the return of the driven coupling to its alternate position.

The preferred actuating arrangement is composed of a relatively few components and employs the relative motion between the two coupling members to automatically activate and release the locking means so that the power cylinder is essentially isolated from the actuated member when the piston rod is fully extended.

These and other advantages of the present invention will readily occur to one skilled in the art to which the invention pertains upon reference to the following detailed description.

DESCRIPTION OF THE DRAWING

The description refers to the accompanying drawing in which like reference characters refer to like parts throughout the several views and in which:

FIG. 1 is an exploded view of an actuating arrangement illustrating the preferred embodiment of the invention;

FIG. 2 is a longitudinal sectional view through the actuating arrangement of FIG. 1 with the piston rod retracted; and FIG. 3 is a longitudinal sectional view similar to FIG. 2 but showing the piston rod extended.

DESCRIPTION OF THE PREFERRED EMBODIMENTS

Now referring to the drawing, a preferred actuating arrangement comprises includes a support means comprising an elongated sleeve-like housing 10 having an internal bore 12 and fixedly attached to actuating means 14. The actuating means 14 comprises a fluid actuated power cylinder having a piston rod 18 which extends into one end of the bore 12. The piston rod 18 is adapted to be extended and retracted upon the application of fluid pressure on a piston (not shown) carried on the end of the rod disposed within the cylinder 16. The housing 10 is fixedly attached to the end of the cylinder 16 by suitable means and has a pair of lateral openings 20 and 22 formed in diametrically opposite sides of the housing 10.

A driving means are coupling member 24 is axially slidably disposed in the bore 12 and connected to the end of the rod 18 by a fastening member 26 which is threadably mounted on the rod. The fastening member 26 allows a little free play so that the travel of the coupling member 24 in the bore 12 is slightly less than the full stroke of the piston rod 18. Thus, the driving coupling member 24 is connected to the actuating means 14 through a lost motion connection. The driving coupling member 24 also has a collar 28 extending axially away from the cylinder 16. The collar 28 has a pair of slots 30 and 32 which register with the openings 20 and 22 when the rod 18 is fully extended from the cylinder.

A driven means on coupling member 34 is axially slidably disposed in the bore 12 with its outer end slotted as at 35 for coupling to an actuable member (not shown) such as the die of an injection molding apparatus. The driven coupling member 34 has an elongated axially directed nose portion 36 slidably disposed in the collar 28 of the driving coupling member. The nose portion 36 has a longitudinally extending, transverse slot 38. A pin 40 carried by the collar 28 extends through the slot 38 to interconnect the two coupling members 24 and 34 so that they are free for relative axial movement a distance defined by the length of the slot 38. The nose 36 also has a second transverse slot 42 extending at right angles to the slot 38.

A pair of locking plates 44 and 46 are slidably disposed in the slot 42 for motion transverse to the axis of motion of the coupling member 34 between an extended position where they project out of the slot 42 and a retracted position where they are substantially disposed within the nose 36. It is to be noted that the locking plates 44 and 46 move in opposite radial or lateral directions so that when the driven coupling 34 is in the position where the slot 42 registers with the openings 20 and 22 of the housing, the locking plates abut the driven coupling member 34 and can extend into the lateral openings 20 and 22 and lock the coupling 34 in place.

The locking plates 44 and 46 are formed with slots 48 and 50 respectively which are inclined relative to the axis of motion of the coupling member 34. The pin 40 extends through the slots 48 and 50 of the locking plates so that when the coupling 24 moves away from the coupling 34, the pin causes the locking plates to retract into the nose 36, and when the coupling 24 moves toward the coupling 34 the pin 40 causes the locking plates to extend out of the nose 36.

Referring to FIGS. 2 and 3, the stroke of the driving coupling 24 is greater than the stroke of the driven coupling 34 because of the relative movement that occurs between the two coupling members as the rod 18 is extended and retracted.

FIG. 2 shows the rod 18 in its retracted position with the pin 40 at one end of the slot 38 and the locking plates 44 and 46 retracted within the nose 36 so that the two coupling members are free to move in the bore 12. As the rod 18 is initially extended from the cylinder 16 it moves until it comes into abutment with the coupling member 24 and then commences to move the coupling member 24 in the forward direction so that the pin 40 engages the side of the slots 48 and 50 of the two locking plates. The pin 40 produces an axial force on the locking plates 44 and 46 which causes them to move the driven coupling 34 in the forward direction and also produces a lateral force on the locking plates which causes them to extend from within the nose 36. This motion continues with the pin 40 traveling the length of the slots 48 and 50 of the locking plates until the rod 18 is fully extended. The locking plates are then fully extended and engaged in the lateral openings 20 and 22 of the housing with the pin 40 at the opposite end of the slots 48 and 50 and the slot 38 of the nose portion 36.

As can be seen in FIG. 3, when the piston rod 18 is fully extended the driven coupling 34 is in its leftmost operative position. It will be noted that in this position, an axial force acting on the driven coupling 34 will be transmitted through the locking plates 44 and 46 to the housing 10 so that the piston rod 18 and the coupling member 24 are essentially isolated from any secondary forces acting on the driven coupling 34. Because forces acting on the driven coupling 34 cannot produce relative movement between the two coupling members so as to retract the locking plates, the driven coupling member 34 is automatically locked in place until the driven coupling member 24 is moved in the reverse direction by retraction of the rod 18.

When the rod 18 is initially retracted, it moves until the head of the fastening member 26 engages the coupling member 24 and then pulls the coupling 24 in the reverse direction with the pin 40 acting on the opposite sides of the slots 48 and 50 of the locking plates so that they commence to retract into the slot 42 of the nose portion. The pin 40 also produces an axial force which returns the coupling member 34 in the reverse direction toward its initial position. The locking plates 44 and 46 are dimensioned slightly smaller than the lateral openings 20 and 22 in the housing so that they will clear the ends of the lateral openings as they extend and retract with the axial motion of the coupling 34.

It is to be understood that I have described an improved linear actuating arrangement having locking means for automatically locking the driven coupling member to the housing, the locking means being responsive to relative movement between the two coupling members and activated by the motion of the driving coupling member.

Although I have described but one embodiment of my invention, it is to be understood that various changes and revisions can be made therein without departing from the spirit of the invention as expressed in the scope of the appended claims.

Having thus described my invention, I claim:

1. An actuating arrangement for moving an actuatable member between a pair of spaced positions, comprising:
   (a) a housing having an elongated axial bore and lateral openings extending from said bore;
   (b) a driving coupling member slidably disposed in said bore for axial motion;
   (c) an actuating means extending through one end of said bore, connected to said driving coupling member and adapted to move said driving coupling member in forward and reverse axial directions between first and second axially spaced positions;
   (d) a driven coupling member slidably disposed in said bore for axial motion and adapted for connection to an actuatable member;
   (e) means connecting said driving and driven coupling members so that movement of the driving coupling member by said actuating means in one of said directions drives the driven coupling member in the same direction and causes relative axial movement between said coupling members; and
   (f) a pair of locking plates carried by said driven coupling member for sliding movement in response to the relative movement between said driving and driven coupling members between a retracted position for allowing movement of said driven coupling member in said bore and an extended position engaged in the lateral openings in said housing for restricting motion of the driven coupling member.

2. The actuating arrangement as defined in claim 1, wherein said locking plates are received by said lateral openings to lock said driven coupling member against axial motion in said bore when the driving coupling member is in its second position and disengaged from said lateral openings when the driven coupling member is in its first position.

3. The actuating arrangement as defined in claim 1, wherein said locking plates each have a slot, inclined relative to the axial motion of said coupling members and including means for mounting said locking plates on said driven coupling member for motion transverse to the axial motion of the driven coupling member but fixed from axial motion relative to said driven coupling member, a pin fixedly carried by said driving coupling member engaged in the slots of said locking plates to extend said plates toward said lateral openings when said driving coupling member is moving in the forward direction and to retract said locking plates from said lateral openings when said driving coupling member is moving in the reverse direction.

4. The actuating arrangement as defined in claim 1, wherein said locking plates each have a slot, inclined relative to the relative motion between said coupling members and including means for mounting said plates on said driven coupling member for motion transverse to the axes of motion of the said driven coupling member but fixed from axial motion relative to said driven coupling member, a pin fixedly carried by said driving coupling member engaged in the slots of said locking plates so that movement of said driving coupling member in the forward direction pushes said driven coupling member in the forward direction, and movement of said driving coupling member in the reverse direction pulls said driven coupling member in the reverse direction.

5. The actuating arrangement as defined in claim 1, wherein said driving coupling member has an axially directed sleeve portion and said driven coupling member has an elongated axially directed nose portion extending into the sleeve portion of said driving coupling member, said nose portion being formed with a longitudinally extending slot, and including a pin fixedly carried by the sleeve portion of said driving coupling member engaged in the slot of said nose portion so that said driving and driven coupling members are axially movable relative to one another.

6. The actuating arrangement as defined in claim 5, wherein said nose portion has a slot for a locking plate and said pair of locking plates are movable in said locking plate slot in directions transverse to the axial motion of said driven coupling member between extended and retracted positions, each of said locking plates having a slot engaged with said pin so that relative movement between said coupling members moves said locking plates between their extended and retracted positions.

7. The actuating arrangement as defined in claim 6, wherein said actuating means comprises a cylinder fixedly attached to said housing with a piston rod extending into said bore and connected to said driving coupling member for motion in opposite axial directions.

8. An actuating assembly comprising: supporting means, driven means movably supported by said support means for movement between actuated and deactuated positions, driving means movably supported by said support means, means operatively interconnecting said driven and driving means for moving said driven means in response to movement of said driving means and including locking means movable relative to and transversely to the direction of movement of said driven means and said driving means and abutting said driven means and operably connected to said driving means for movement thereby to and from a locked position in wedging engagement with said support means and said driving means respectively to prevent said driven means from moving toward said deactuated position except by movement of said driving means.

9. An assembly as set forth in claim 8 including actuating means connected to said driving means through a lost motion connection.

10. An assembly as set forth in claim 8 wherein said locking means includes at least one locking member movable relative to said driven means, said driving means and said support means said locking means having one inclined surface for wedging engagement with said support means and another inclined surface for wedging engagement with said driving means.

11. As assembly as set forth in claim 10 wherein said support means comprises a housing having an axial bore therealong, said driving means being disposed in said bore for axial movement therealong, said driven means being disposed in said bore for axial movement therealong between said actuated and said deactuated positions, said locking member being axially movable by said driving means and radially movable by said driving means into said locked position.

12. An assembly as set forth in claim 11 including a pair of said locking members in the form of locking plates, said housing having lateral openings extending from said bore, said openings having inclined surfaces for wedging engagement with the inclined surfaces on said locking plates, said locking plates each have a slot with a wedge portion defining the inclined surface for coacting with said driving means, said driving means including a pin extending through said slots to move said plates and said driven means axially and to move said plates radially into engagement with said lateral openings.

13. An assembly as set forth in claim 12 wherein said driven means has an elongated slot therein and said pin extends therethrough.

14. An assembly as set forth in claim 13 including actuating means connected to said driving means through a lost motion connection.

References Cited

UNITED STATES PATENTS

| | | | |
|---|---|---|---|
| 2,319,479 | 5/1943 | Ryder. | |
| 3,046,802 | 7/1962 | Cupedo | 74—110 |
| 3,385,559 | 5/1968 | Churchill | 74—527 XR |
| 3,405,569 | 10/1968 | Wroble | 74—527 |
| 3,113,466 | 12/1963 | Osborne | 74—110 |
| 3,388,606 | 6/1968 | Hill | 74—110 |

FRED C. MATTERN, JR., Primary Examiner

F. D. SHOEMAKER, Assistant Examiner